(12) United States Patent
Hernandez-Sanchez et al.

(10) Patent No.: US 9,517,937 B2
(45) Date of Patent: Dec. 13, 2016

(54) METHOD TO SYNTHESIZE METAL CHALCOGENIDE MONOLAYER NANOMATERIALS

(71) Applicant: Sandia Corporation, Albuquerque, NM (US)

(72) Inventors: Bernadette A. Hernandez-Sanchez, Albuquerque, NM (US); Timothy J. Boyle, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/660,702

(22) Filed: Mar. 17, 2015

(65) Prior Publication Data

US 2015/0266735 A1    Sep. 24, 2015

Related U.S. Application Data

(60) Provisional application No. 61/968,182, filed on Mar. 20, 2014.

(51) Int. Cl.
| | |
|---|---|
| *C01B 17/20* | (2006.01) |
| *C01B 17/42* | (2006.01) |
| *C01B 19/00* | (2006.01) |
| *C01B 19/04* | (2006.01) |
| *C01G 1/00* | (2006.01) |
| *C01F 11/00* | (2006.01) |
| *C01G 39/06* | (2006.01) |
| *C01G 41/00* | (2006.01) |

(52) U.S. Cl.
CPC ............ *C01B 19/007* (2013.01); *C01B 17/20* (2013.01); *C01B 17/42* (2013.01); *C01F 11/00* (2013.01); *C01G 39/06* (2013.01); *C01G 41/00* (2013.01); *C01P 2002/72* (2013.01); *C01P 2002/77* (2013.01); *C01P 2002/85* (2013.01); *C01P 2002/88* (2013.01); *C01P 2004/04* (2013.01)

(58) Field of Classification Search
CPC .......... C01B 17/20; C01B 17/42; C01B 19/00; C01B 19/007; C01B 19/04; C01G 1/00; C01G 1/12; B82B 1/008; B82B 3/0095; B82Y 40/00
See application file for complete search history.

(56) References Cited

U.S. PATENT DOCUMENTS

| | | | | |
|---|---|---|---|---|
| 7,374,824 | B2 * | 5/2008 | Bawendi ............... | B82Y 30/00 428/403 |
| 8,617,707 | B2 * | 12/2013 | Krauss .................. | B82Y 30/00 427/212 |
| 2004/0033359 | A1 * | 2/2004 | Bawendi ............... | B82Y 30/00 428/403 |
| 2006/0135669 | A1 * | 6/2006 | Ryang ................... | B82Y 10/00 524/430 |
| 2006/0182970 | A1 * | 8/2006 | Bawendi ............... | B82Y 30/00 428/402 |

(Continued)

FOREIGN PATENT DOCUMENTS

WO    WO 2012056121 A1 *  5/2012    ............. B82Y 30/00

*Primary Examiner* — Timothy Vanoy
(74) *Attorney, Agent, or Firm* — Kevin W. Bieg (57) ABSTRACT

Metal chalcogenide monolayer nanomaterials can be synthesized from metal alkoxide precursors by solution precipitation or solvothermal processing. The synthesis routes are more scalable, less complex and easier to implement than other synthesis routes.

15 Claims, 9 Drawing Sheets

(56) References Cited

U.S. PATENT DOCUMENTS

2014/0011317 A1* 1/2014 Gresty .................. C01B 19/007
438/95
2014/0084212 A1* 3/2014 Kikuchi ................. B82Y 40/00
252/301.6 S

* cited by examiner

W(OEt)$_5$ + S(SiMe$_3$)$_2$ → WS$_2$

FIG. 4(b)

WCl$_4$ + (t-BuS)$_2$ → WS$_2$

FIG. 4(c)

WCl$_4$ + (PhS)$_2$ → WS$_2$

METHOD TO SYNTHESIZE METAL CHALCOGENIDE MONOLAYER NANOMATERIALS

CROSS-REFERENCE TO RELATED APPLICATION

This application claims the benefit of U.S. Provisional Application No. 61/968,182, filed Mar. 20, 2014, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to metal chalcogenides and, in particular, to a method to synthesize metal chalcogenide monolayer nanomaterials.

BACKGROUND OF THE INVENTION

Synthetic routes to tungsten disulfide ($WS_2$) and molybdenum disulfide ($MoS_2$) nanomaterials (e.g., two-dimensional (2D) monolayers) are of interest for lubricants, catalyst, Li-ion batteries, semiconductors, and photodiodes. Previous efforts to synthesize bulk $WS_2$ nanomaterials involved chemical vapor deposition techniques, fluidized bed reactors, gas-solid reactions, laser ablation, and spray pyrolysis. For the production of 2D metal sulfide monolayer nanomaterials, synthesis have been limited to high temperature solid-state routes, sulfurization with $H_2S$ gas, vapor phase routes, exfoliation, and metathesis reaction routes with halide side products that can be detrimental to the application's performance properties. See Y. Feldman et al., Solid State Sciences 2(6), 663 (2000); C. Altavilla et al., Chem. Mater. 23, 3879 (2011); H. R. Gutierrez et al., Nano Lett. 13(8), 3447 (2013); and Y. Yu et al., Nature, Scientific Reports, 2013, 3:1866 DOI: 10.1038/srep01866.

Therefore, a need remains for a solution route for the synthesis of metal chalcogenide monolayer nanomaterials that is scalable, less complex and easier to implement than other synthesis routes.

SUMMARY OF THE INVENTION

The present invention is directed to a novel solution route to 2D metal sulfide monolayer nanomaterials from the reaction between metal alkoxides $M(OR)_x$ and hexamethyldisilathiane (HTMS). According to the present invention, both solution precipitation and solvothermal processing of $M(OR)_x$ and HTMS can be used at low temperatures to produce 2D metal sulfide monolayers. This general reaction route can be extended to produce other metal chalcogenide (ME, E=S, Se, Te) nanomaterials by varying the $M(OR)_x$ and E precursors. The synthesis route yields air-stable layered nanomaterials. The method offers a scalable route that controls surface chemistry, but does not require additional heating or processing under $H_2S$ gas.

BRIEF DESCRIPTION OF THE DRAWINGS

The detailed description will refer to the following drawings, wherein like elements are referred to by like numbers.

DETAILED DESCRIPTION OF THE INVENTION

Figure 1A:
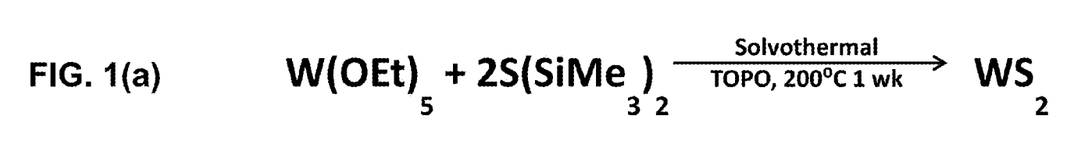
FIGS. 1(a)-(d) show general solution routes for the synthesis of $WS_2$.
Figure 1B:
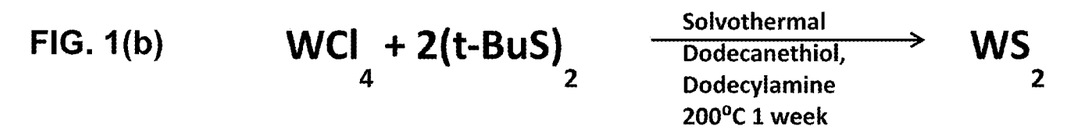
Figure 1C:
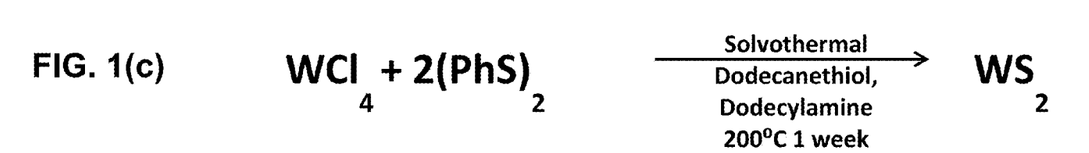
Figure 1D:
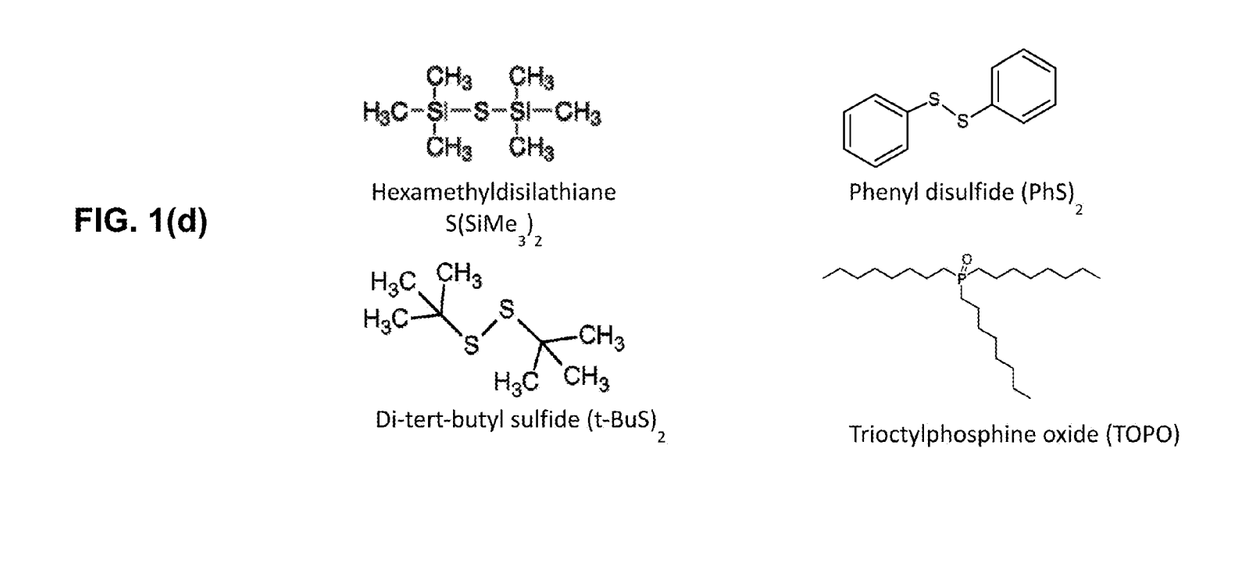

The present invention is directed to a novel solution route to 2D metal sulfide, selenide, or telluride monolayer nanomaterials from the reaction between metal alkoxides $M(OR)_x$ and hexamethyldisilathiane (HTMS, or $S(Si(CH_3)_3)_2$) or trioctylphosphine selenide or telluride. For example, metal sulfide nanomaterials ($MS_x$) can be prepared from the reaction between $M(OR)_x$ and HTMS in high boiling coordinating or non-coordinating solvents. FIGS. 1(a)-(d) show exemplary solution routes for the synthesis of $WS_2$. FIG. 1(a) shows an exemplary solution route to a metal chalcogenide nanomaterial using a metal alkoxide precursor and HTMS. In this example, the production of the transition metal sulfide $WS_2$ can be achieved by the solvothermal processing route using tungsten (IV) ethoxide and HTMS. FIGS. 1(b) and 1(c) show exemplary methods using a metal chloride precursor. FIG. 1(d) shows the chalcogenide precursor materials. These methods can be extended to $WE_x$ and $MoE_x$ more generally. Depending on the conditions used (e.g., solvent, time, temperature) the monolayer size and crystallinity can be controlled. For example, the as-prepared crystalline $WS_2$ monolayers can undergo formation of multilayer $WS_2$ structures after heat treatment under an inert atmosphere.

Eqs. (1) and (2) listed below show the general reaction routes used to produce metal chalcogenides from metal alkoxides:

To produce other metal chalcogenide (ME, E=S, Se, Te) nanomaterials, this general reaction route can also be extended by simply varying the $M(OR)_x$ and E precursors. Therefore, crystalline nanoparticles of alkaline earth chalcogenides ($A^E E$; $A^E$=Ca, Sr, Ba; E=S, Se, Te) have been synthesized using similar procedures. For example, alkaline earth sulfides can be prepared by reacting calcium aryloxide ($Ca(OAr)_2$) or alkaline earth neopentoxides ($A^E(ONep)_2$, where $A^E$=Sr, Ba), and HTMS in a stoichiometric ratio to produce CaS, SrS, and BaS with solvothermal processing, according to Eq. (2). The selenides and tellurides can be prepared by substituting HTMS with either trioctylphoshine selenide or telluride (TOP=E; E=Se, Te) with solution precipitation conditions, according to Eq. (1). CdE materials can also be prepared by this route using cadmium aryl and neopentoxide precursors. See S. D. Bunge et al., *Inorg. Chem.* 44(5), 1309 (2005). The size, shape, and surface chemistry of each of these material systems can be tailored by changing reaction solvent, reaction processing time and temperature used.

As an example, under an inert atmosphere, a mixture of trioctylphosphine oxide (TOPO) (5.00 g, 12.9 mmol), and stoichiometric amounts of the appropriate $M(OR)_x$ and $S(Si(CH_3)_3)_2$ or TOP=Se were added to the teflon liner of a 45 mL Parr Acid Digestion Bomb. The bomb was sealed in the glovebox, placed in an oven and heated to 200° C. for 48 h. After cooling to room temperature, the reaction was transferred into a glovebox and the nanoparticles were washed twice, by dissolving the reaction mixture with toluene, then precipitating the MEx nanoparticles with MeOH. The nanoparticles could be redispersed with toluene. Black powders were washed and isolated for both the $WS_2$ and $MoSe_2$ reactions. Each was dispersible in toluene. Once isolated, the powders were characterized with TEM, EDS, TGA/DTA, and XPS. These results are described below.

Figure 2A:
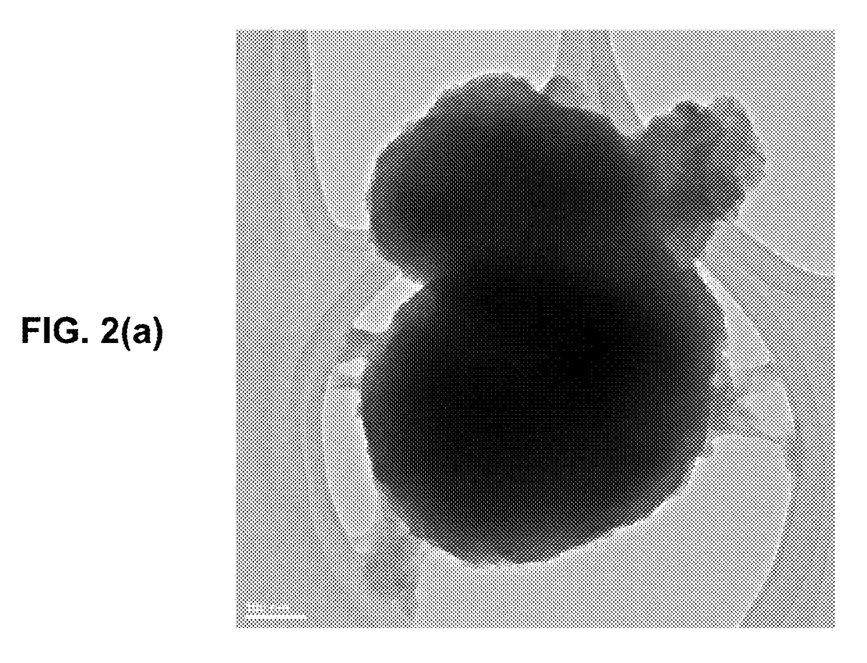
FIG. 2(a) is a transmission electron microscope (TEM) image of as-prepared $WS_2$ particles.
Figure 2B:
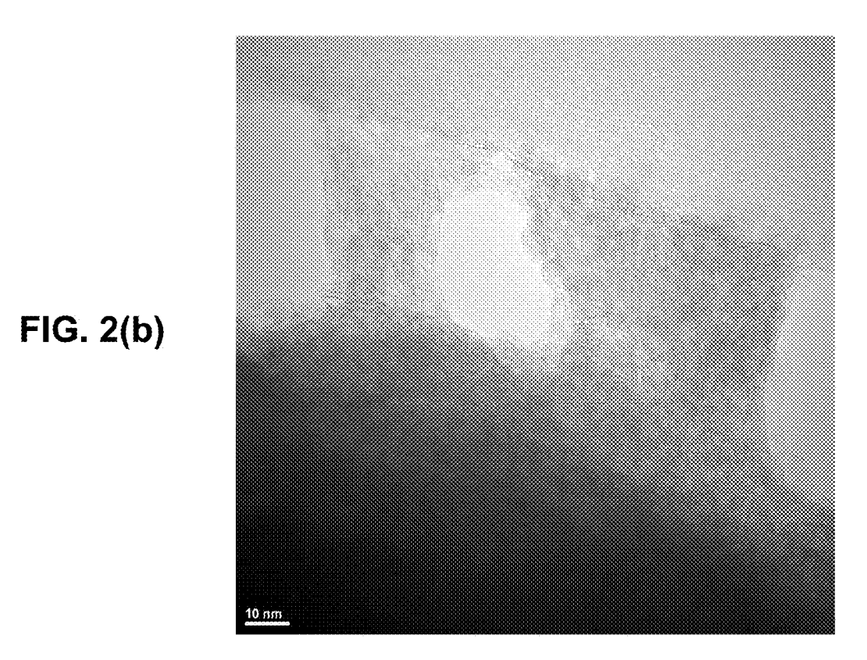
FIG. 2(b) is a TEM image of the monolayers making up a particle.

FIGS. 2(a)-(b) are transmission electron microscopy (TEM) images of the as prepared tungsten disulfide. FIG. 2(a) shows that agglomerated particles are produced. Upon higher magnification of the agglomerated particles, the image in FIG. 2(b) shows the formation of layered rod structures, as expected from literature reports. See R. Tenne et al., *Nature* 360, 444 (1992).

Figure 3A:
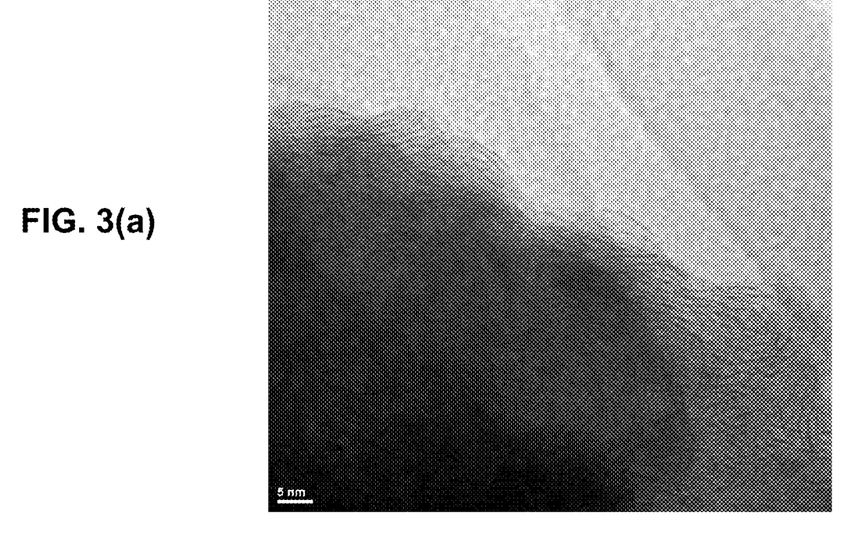
FIG. 3(a) is a TEM image of a $WS_2$ monolayer.
Figure 3B:
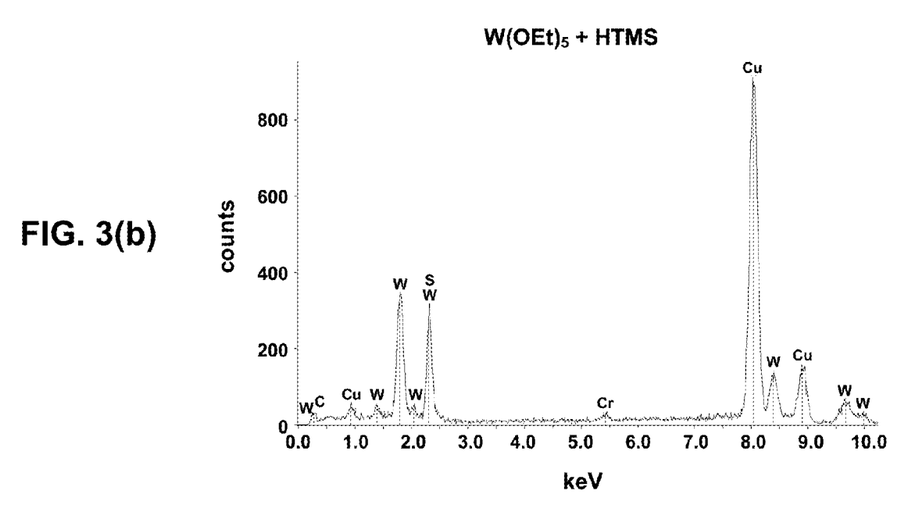
FIG. 3(b) is an energy-dispersive X-ray spectrum (EDS) of the $WS_2$ monolayer.

FIG. 3(a) shows energy-dispersive X-ray spectrum (EDS) of the $WS_2$ particle shown in FIG. 3(b), as synthesized via the $W(OEt)_5$ route. The EDS spectrum of the particles shows peaks of tungsten and sulfur suggesting that $WS_2$ is the sole tungsten product, and that no oxides are formed during the synthesis.

Figure 4A:
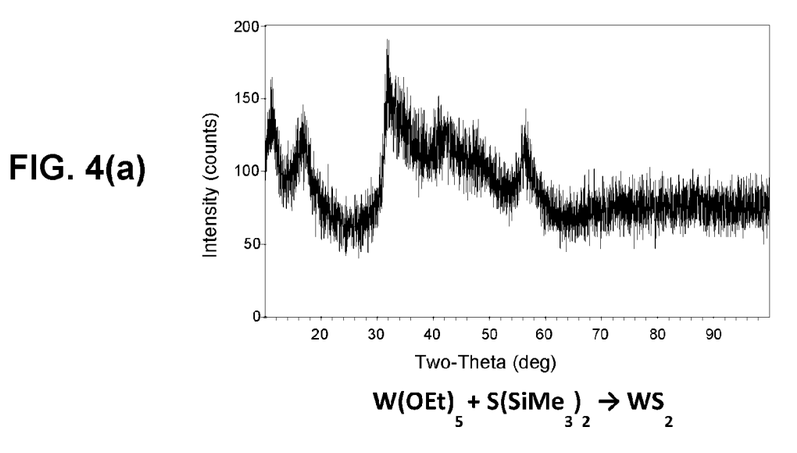
FIGS. 4(a)-(c) show powder X-ray diffraction (PXRD) patterns of the tungsten disulfides as prepared.
Figure 4B:
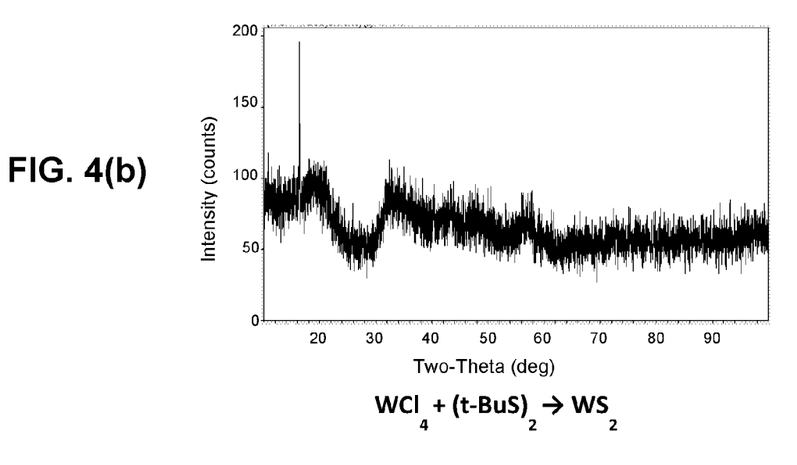
Figure 4C:
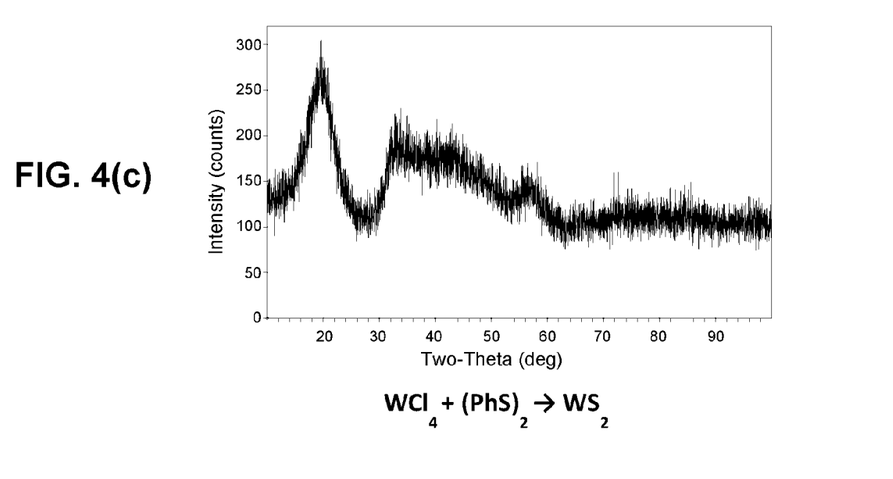

FIGS. 4(a)-(c) show powder XRD patterns of the tungsten disulfides as prepared. The patterns resemble those of previously reported tungsten disulfide nanomaterial diffraction patterns, with the $WS_2$ synthesized using the $W(OEt)_5$ route (FIG. 4(a)) showing the most resemblance. See C. Altavilla et al., *Chem. Mater.* 23, 3879 (2011).

Figure 5:
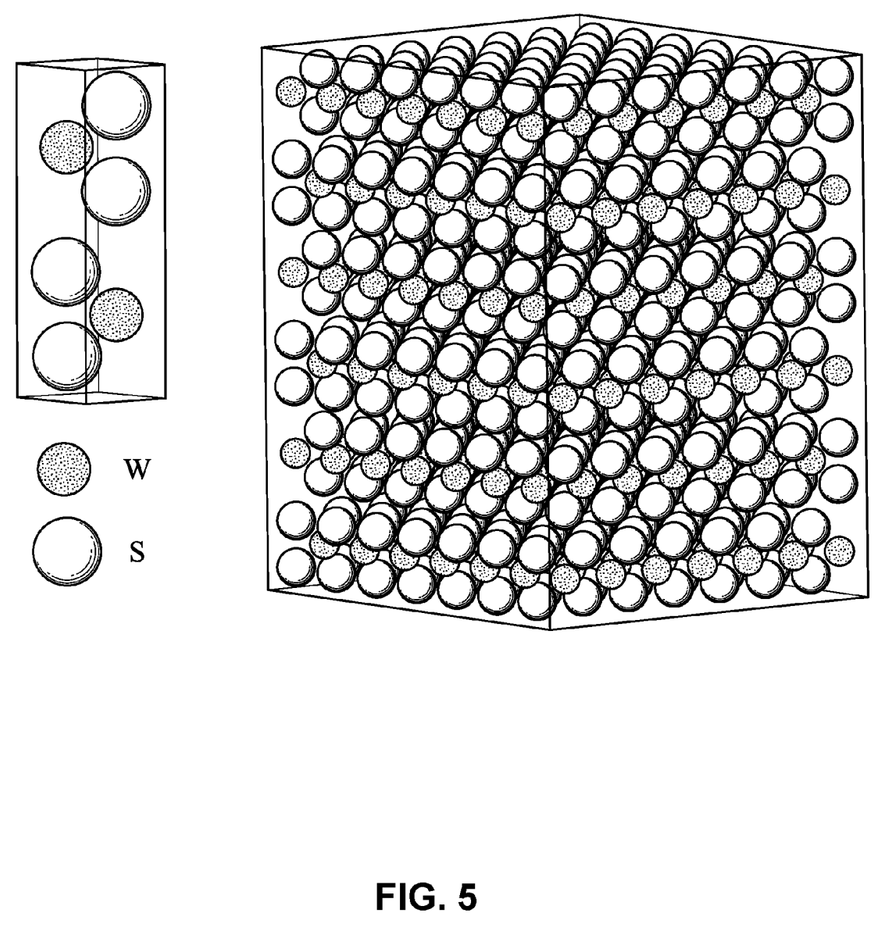
FIG. 5 is a schematic illustration of the layered structure of $WS_2$.

FIG. 5 shows the layered structure of tungsten disulfide. $WS_2$ adopts a layered structure similar to $MoS_2$, wherein each W (IV) atom is situated in a trigonal prismatic coordination sphere bound by six sulfide ligands. Likewise, each sulfur atom is pyramidal and connected to three W centers. Therefore, the trigonal prisms are interconnected to provide a layered structure wherein the tungsten atoms are sandwiched between layers of sulfur atoms. The layers of sulfide atoms are bound by weak van der Waals interactions. The diffraction pattern shows the planes associated with these layers and the absence of other peaks associated with bulk $WS_2$ or tungstenite.

Figure 6:
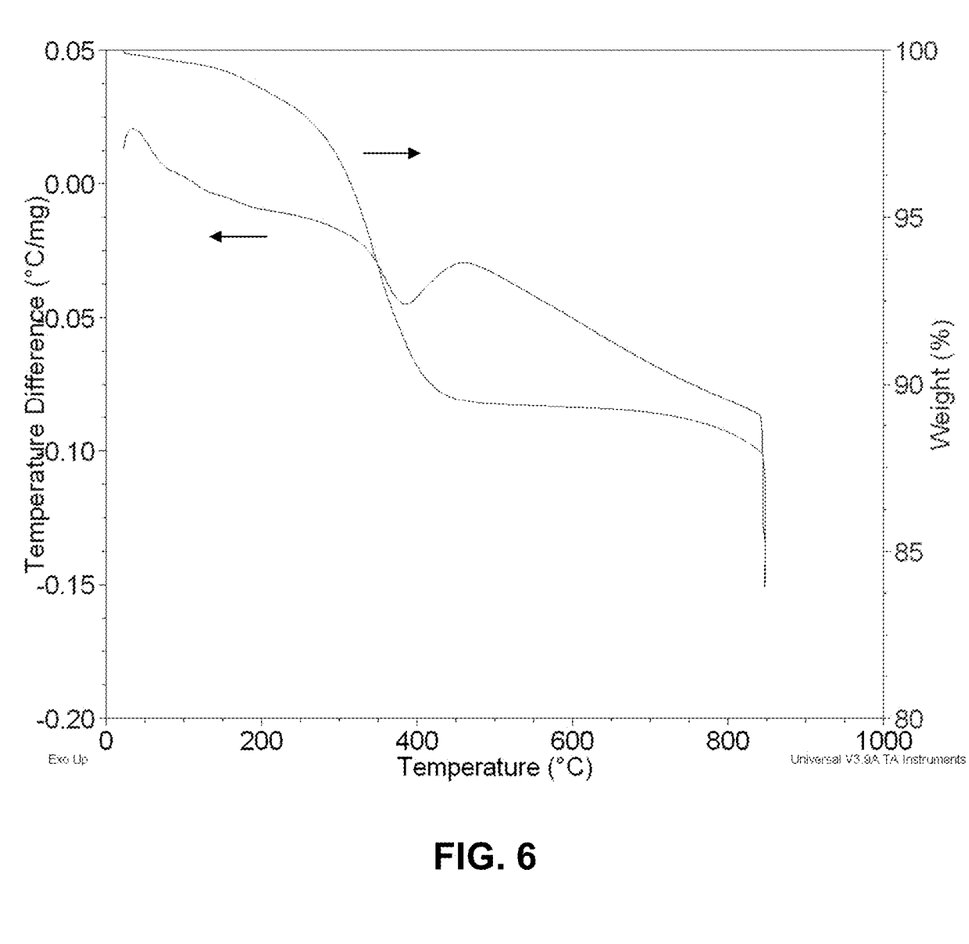
FIG. 6 shows thermogravimetric and differential temperature analyses (TGA-DTA) of the $WS_2$ as synthesized via the $W(OEt)_5$ route.
Figure 7:
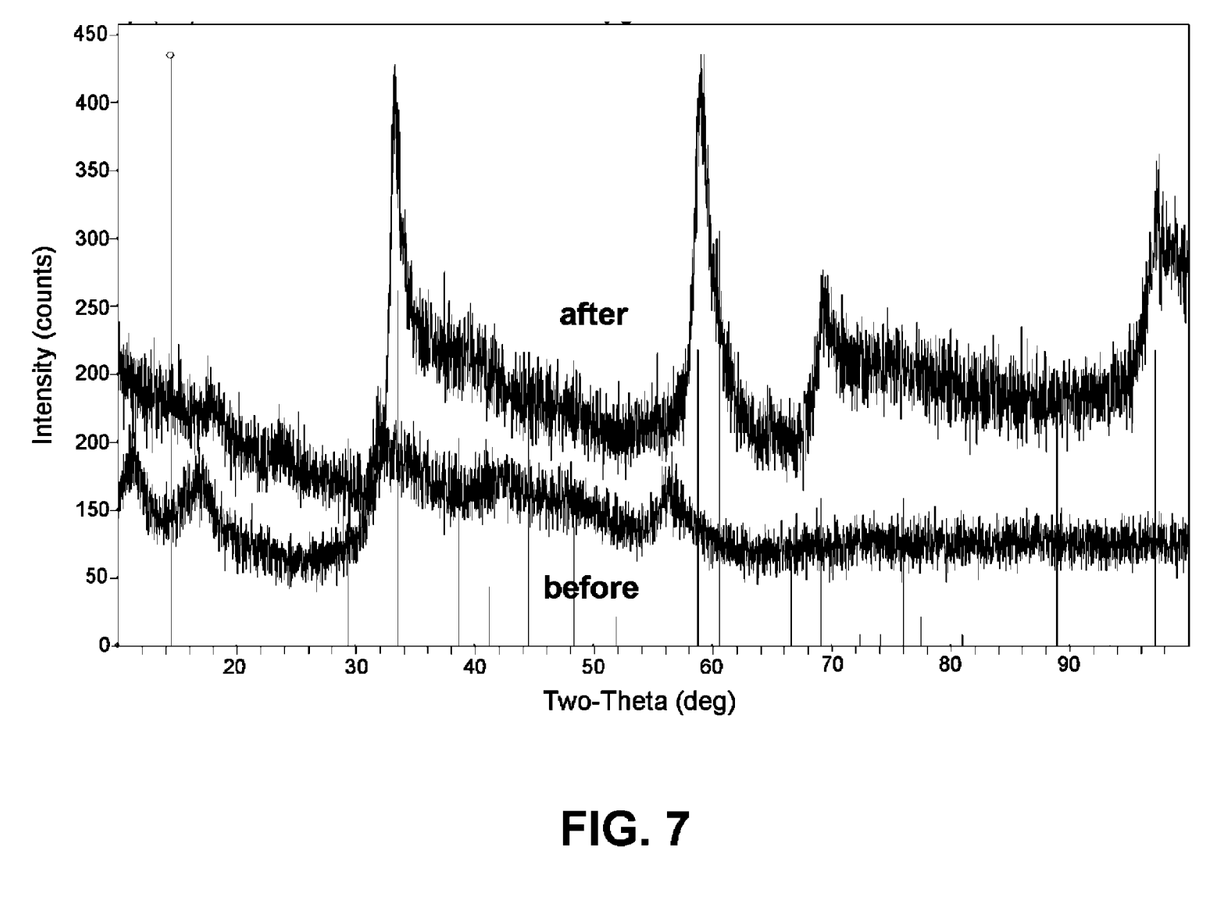
FIG. 7 shows PXRD patterns of $WS_2$ synthesized via the $W(OEt)_5$ route before and after annealing.
Figure 8A:
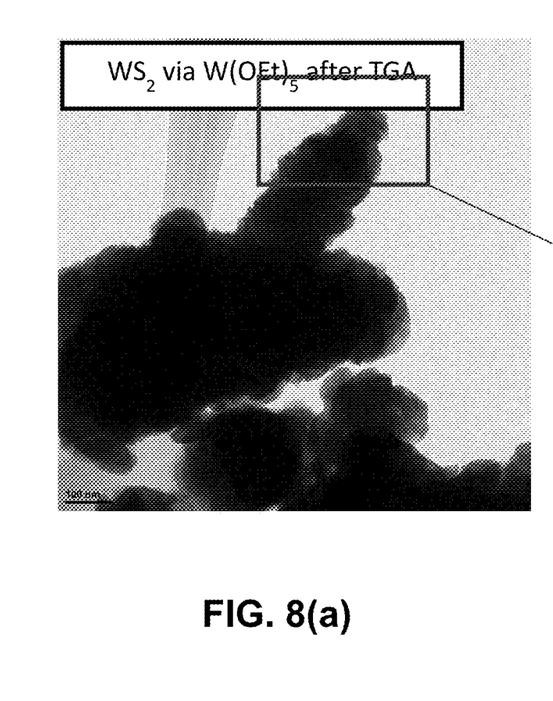
FIGS. 8(a) and 8(b) show TEMs of the $WS_2$ after annealing.
Figure 8B:
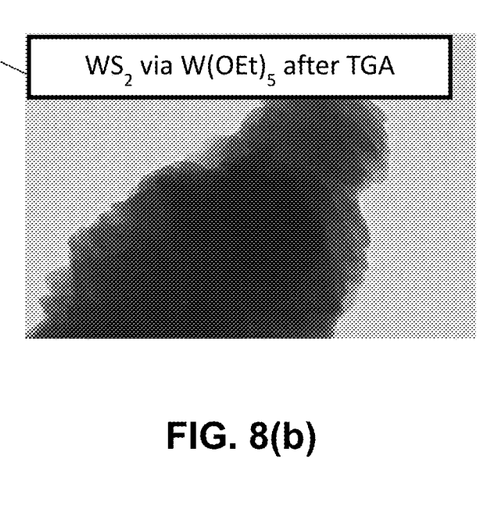

To help identify how these materials crystallize, thermal analysis was performed under argon. This was done as annealing leads to a more layered structure. FIG. 6 shows thermogravimetric and differential temperature analyses (TGA-DTA) of the $WS_2$ as synthesized via the $W(OEt)_5$ route. The samples were ramped up to 850° C. and 10° C./min and held at 850° C. for 10 minutes under argon. A weight loss of 12% was observed in the 300-400° C. range resulting from the loss of organics or the TOPO surfactant. No decomposition of $WS_2$ occurred and as determined by PXRD. FIG. 7 shows the patterns of $WS_2$ before and after annealing. The intensity of the pattern is stronger after annealing. FIGS. 8(a) and 8(b) are TEMs of the $WS_2$ after annealing, revealing that the randomized monolayers are now stacking on top of each other to produce the standard layered $WS_2$.

Figure 9A:
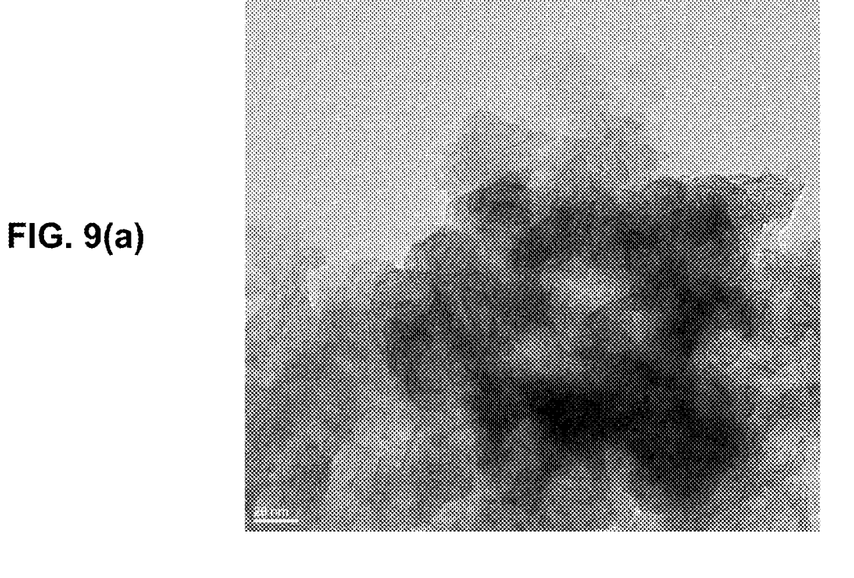
FIG. 9(a) is a TEM of a $MoSe_2$ monolayer.
Figure 9B:
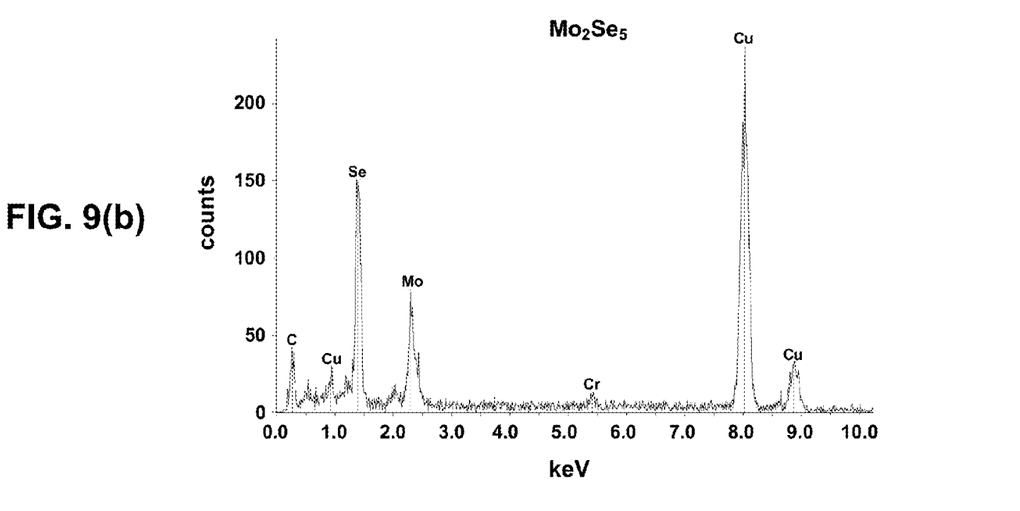
FIG. 9(b) is an energy-dispersive X-ray spectrum of the monolayer.

A similar approach can be used to synthesize the selenides. The TEM image in FIGS. 9(a)-(b) show similar monolayered materials were produced when TOP=Se under similar conditions. EDS also confirmed the presence of Mo and Se.

The present invention has been described as a method to synthesize metal chalcogenide monolayer nanomaterials. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to synthesize a metal chalcogenide nanomaterial according to the reaction:

wherein M is an alkaline earth metal or a transition metal and X is the oxidation state of the metal.

2. The method of claim 1, wherein the transition metal comprises tungsten or molybdenum.

3. The method of claim 2, wherein $M(OR)_x$ comprises $W(OEt)_5$.

4. The method of claim 1, wherein the alkaline earth metal comprises calcium, strontium, or barium.

5. The method of claim 4, wherein $M(OR)_x$ comprises $Ca(OAr)_2$.

6. The method of claim 4, wherein $M(OR)_x$ comprises $A^E(ONep)_2$ and $A^E$ comprises strontium or barium and wherein ONep is neopentoxide.

7. A method to synthesize a metal chalcogenide nanomaterial according to the reaction:

wherein M is an alkaline earth metal or a transition metal and TOP=E is trioctylphoshine selenide or telluride and X is the oxidation state of the metal.

8. The method of claim 7, wherein the alkaline earth metal comprises calcium, strontium, or barium.

9. The method of claim 8, wherein $M(OR)_x$ comprises $Ca(OAr)_2$.

10. The method of claim 8, wherein $M(OR)_x$ comprises $A^E(ONep)_2$ and $A^E$ comprises strontium or barium and wherein ONep is neopentoxide.

11. The method of claim 7, wherein the transition metal comprises cadmium.

12. The method of claim 11, wherein M(OR)x comprises $Cd(OAr)_2$ or $Cd(ONep)_2$.

13. The method of claim 7, wherein the transition metal comprises tungsten or molybdenum.

14. The method of claim 13, wherein the nanomaterial comprises a layered structure.

15. The method of claim 2, wherein the nanomaterial comprises a layered structure.

\* \* \* \* \*